June 14, 1966 T. J. SNAVELY 3,255,834
TRACTION DRIVE AND STEERING MECHANISM FOR VEHICLES
Filed Oct. 28, 1963 3 Sheets-Sheet 2
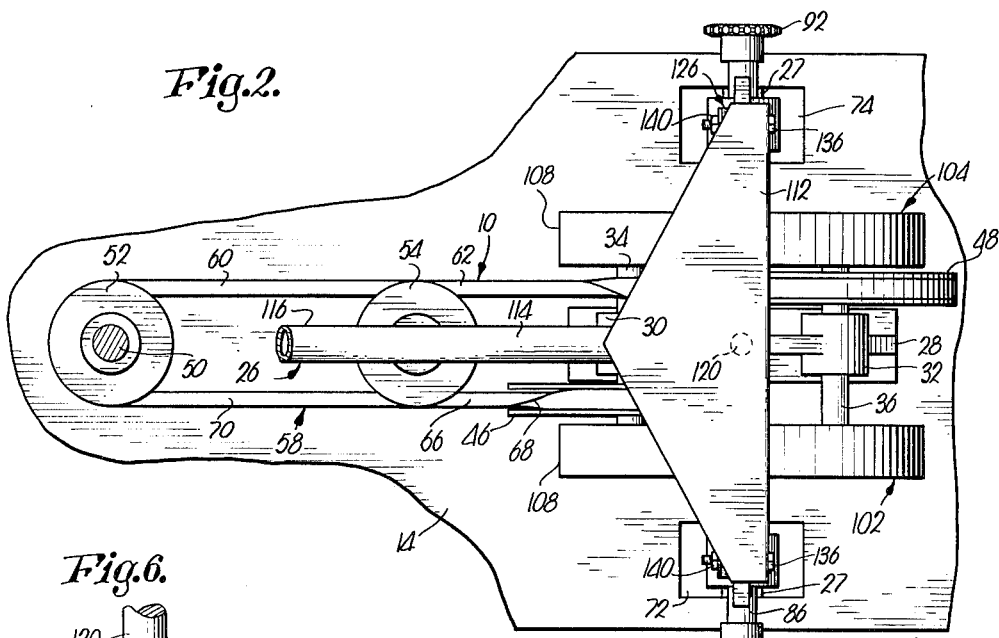
Fig.2.
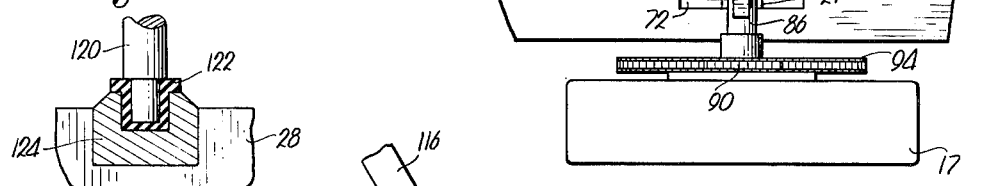
Fig.6.
Fig.7.
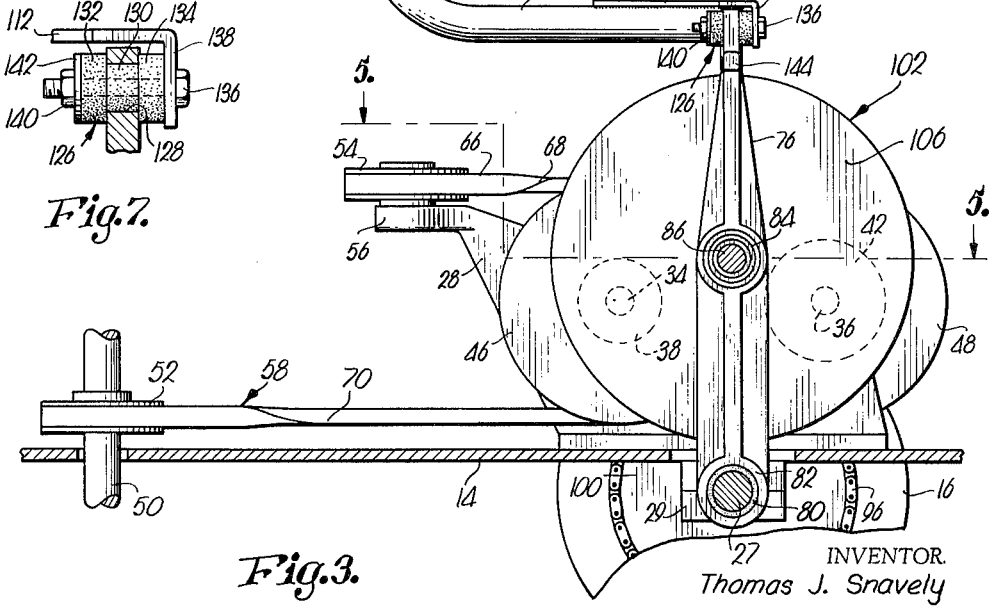
Fig.3.
INVENTOR.
Thomas J. Snavely
BY
Hovey, Schmidt, Johnson & Hovey
ATTORNEYS.

June 14, 1966 T. J. SNAVELY 3,255,834
TRACTION DRIVE AND STEERING MECHANISM FOR VEHICLES
Filed Oct. 28, 1963 3 Sheets-Sheet 3
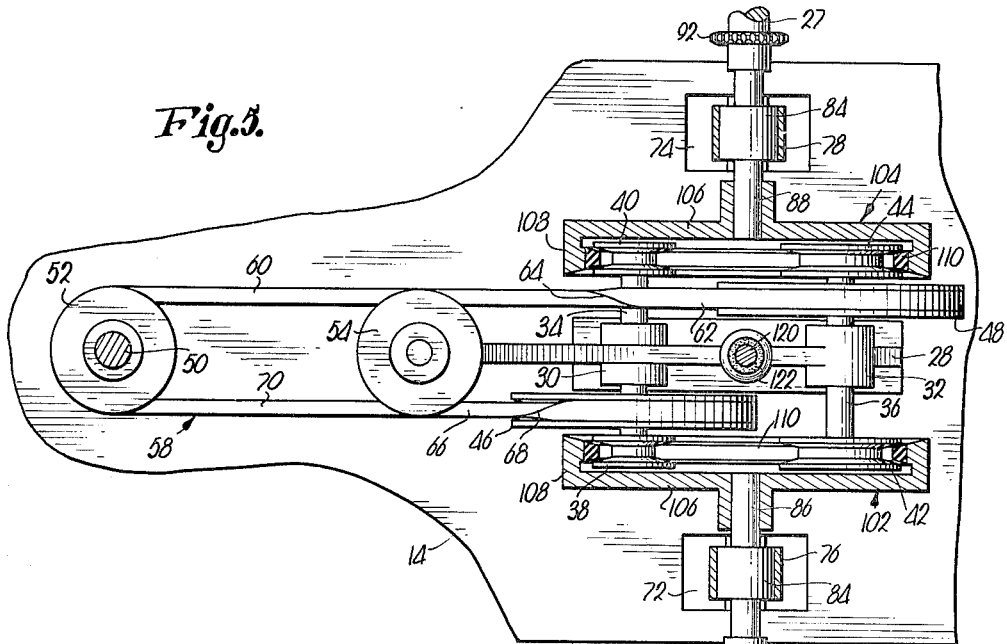
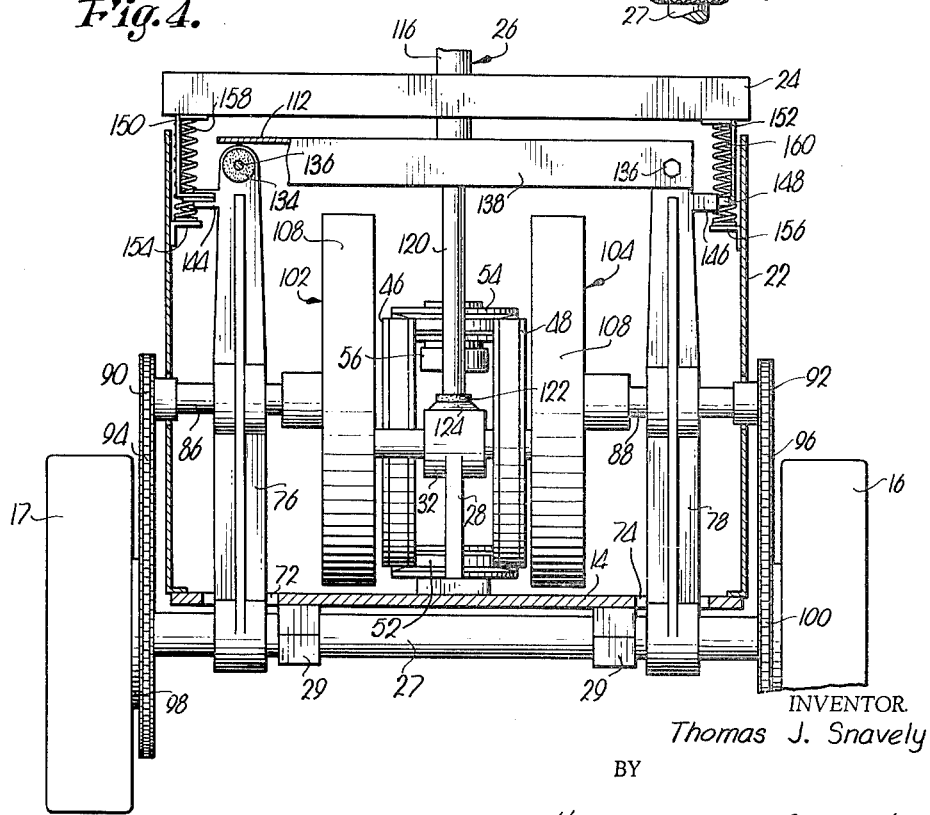
INVENTOR.
Thomas J. Snavely
BY
Hovey, Schmidt, Johnson & Hovey
ATTORNEYS.

United States Patent Office 3,255,834
Patented June 14, 1966

3,255,834
TRACTION DRIVE AND STEERING MECHANISM FOR VEHICLES
Thomas J. Snavely, Peabody, Kans., assignor to Hesston Manufacturing Company, Inc., Hesston, Kans., a corporation of Kansas
Filed Oct. 28, 1963, Ser. No. 319,477
2 Claims. (Cl. 180—6.66)

This invention relates to an improved power transmission for vehicles or the like and has as its primary object the provision of apparatus of improved and simplified construction for use in imparting rotation to a number of ground-engaging wheels of a vehicle to drive the same, while at the same time providing means for steering the vehicle, all of which functions are controlled by a single control member manipulatable at will by an operator carried on the vehicle.

Another object of the present invention is the provision of a power drive for use in driving a vehicle or the like and which utilizes a pair of clutch members movable into coupled relationship with a pair of contrarotating shafts in a manner such that, by selectively coupling the clutch members to the shafts by manipulating a single control, forward and reverse movements, as well as relatively sharp turning movements, may be imparted to the vehicle to which the drive is attached.

Still another object of the present invention is the provision of a power drive for a vehicle which is controlled by the manipulation of a single control level movable forwardly and rearwardly and from side-to-side relative to the vehicle while being coupled to the aforesaid clutch members whereby the direction of movement of the control member will determine the direction of movement of the vehicle and structure additional to and independent of the control member is thus obviated.

A further object of the present invention is the provision of power drive structure for selectively driving either or both of a pair of ground-engaging vehicle wheels at the will of the operator of the vehicle so that relatively sharp turns may be executed with ease and facility and so that the vehicle may be guided and maneuvered along any desired path of travel over the ground.

Still another object of the present invention is to provide structure capable of accomplishing the aforementioned functions through the use of relatively simple, inexpensive parts that are easily assembled and maintained and are capable of long service without excessive repair and replacement costs.

In the drawings:

FIG. 2 is an enlarged, top plan view of the major portion of the power drive of the present invention showing the movable parts thereof in a neutral or nondriving condition, parts being in section to illustrate details of construction;

FIG. 3 is a side elevational view of the power drive illustrated in FIG. 2 with parts being removed and in section to illustrate details of construction thereof, the parts being in a neutral of nondriving condition;

FIG. 4 is an end elevational view of the power drive with the moving parts thereof in a neutral or nondriving condition and showing the locking means coupled with a seat of the vehicle to which the power drive is attached for preventing operation of the vehicle until an operator is seated thereon;

FIG. 5 is a cross-sectional view of the power drive taken along line 5—5 of FIG. 3;

FIG. 6 is a fragmentary, elevational view of the resilient attachment means for securing the control stick of the power drive to the support on which the power drive is disposed;

FIG. 7 is an enlarged, side elevational view of the resilient connection between the control stick and a pair of arms coupled with respective clutch members engageable with and driven by a pair of contrarotating shafts on the support;

Figure 1:
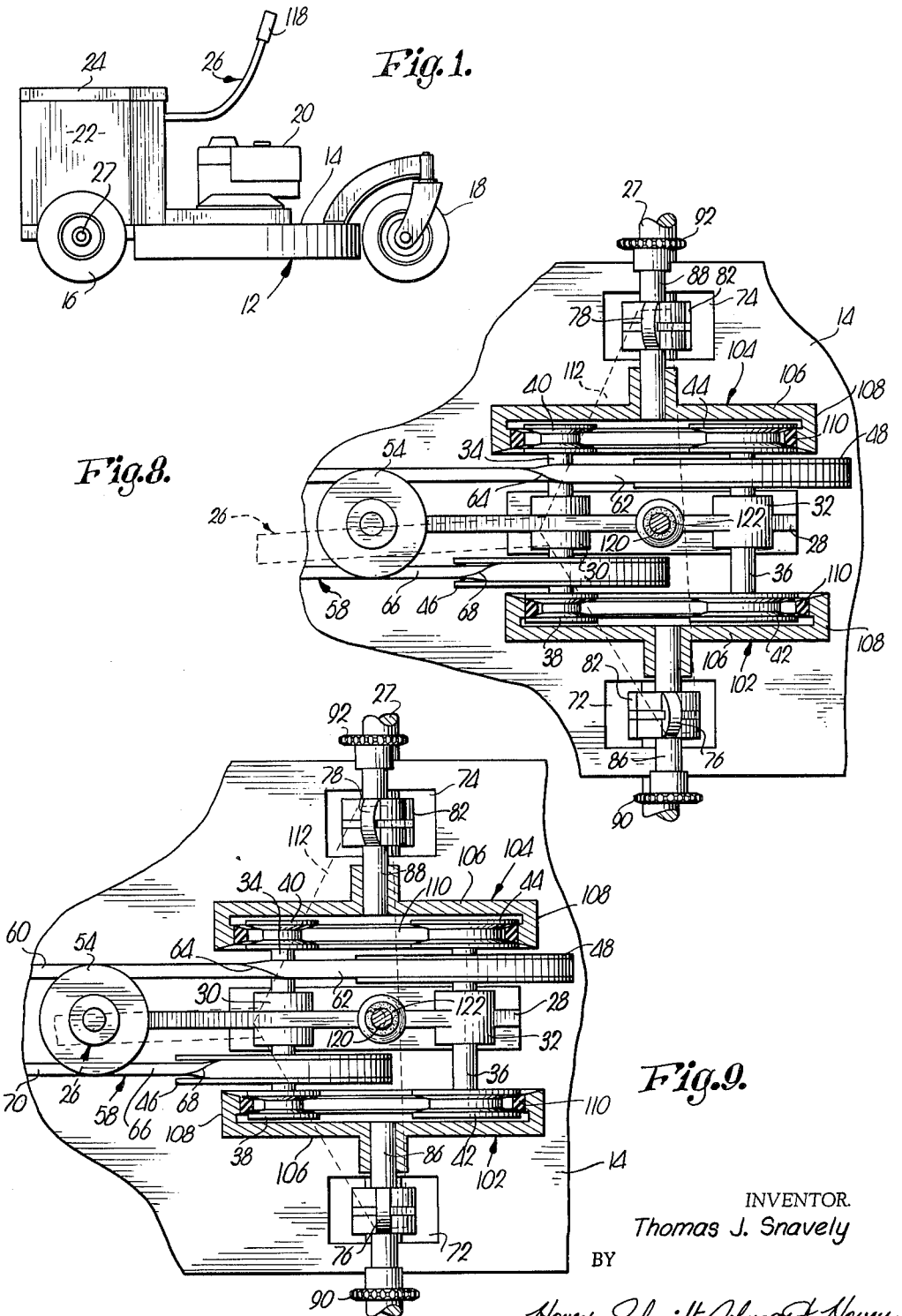
FIGURE 1 is a side elevational view of a vehicle of the type utilizing the power drive forming the subject of the present invention.

FIG. 8 is a plan view of a portion o fthe power drive with the clutch members in predetermined, operative positions with respect to the oppositely rotating shafts for making a turn to one side of the vehicle, the clutch members being in section to illustrate their relative positions with respect to the shafts; and FIG. 9 is a view similar to FIG. 8 but illustrating another operative condition of the clutch members with respect to the shafts for executing another turning movement for the vehicle.

A power drive unit 10 forming the subject of the present invention is adapted to be utilized with power driven apparatus such as vehicle 12 illustrated in FIG. 1. Vehicle 12 includes a support 14 having a pair of axially aligned, ground-engaging rear wheels 16 and 17 at the rear extremely thereof, and at least one swivelly mounted, ground-engaging front wheel at the opposite extremity thereof, wheels 16, 17 and 18 rendering support 14 mobile over the ground.

A motor 20 is carried on support 14 between wheels 16, 17 and 18 and adjacent a housing 22 beneath the seat 24 of vehicle 12. Unit 10 is disposed within housing 22 and coupled with motor 20 and wheels 16 and 17 for selectively driving the latter under the influence of motor 20. An operator sitting on seat 24 and facing in the direction of wheel 18 may control the direction of movement of vehicle 12 by a control member or stick 26 coupled with unit 10 to control the operation of the same in a manner hereinafter described. A suitable throttle (not shown) may be utilized for controlling motor 20 and thereby determines the speed at which vehicle 12 moves over the ground.

Unit 10 includes a generally vertically disposed supporting plate 28 rigidly secured to support 14 substantially between wheels 16 and 17 as is clear in FIGS. 2 and 3. The plane of plate 28 is substantially parallel to the planes of rotation of wheels 16 and 17.

As shown in FIG. 4, support 14 is plate-like in construction. An axle 27 is secured by clamping elements 29 to the underside of support 14, and wheels 16 and 17 are journalled at respective ends of axle 27 for rotation relative to support 14 and for rotation independently of each other.

A pair of spaced sleeves 30 and 32 extending outwardly in opposed directions from plate 28 in spaced relationship to support 14 provide housings for bearing means (not shown) for a pair of substantially parallel shafts 34 and 36 respectively for rotating the latter about axes substantially parallel with the axes of rotation of wheels 16 and 17. A pair of pulleys 38 and 40 are rigid to the opposed ends of shaft 34, and a pair of pulleys 42 and 44 are rigid to the opposed ends of shaft 36. For purposes of illustration, pulleys 42 and 44 are of a diameter greater than the pulleys 38 and 40. Pulley 38 is in alignment with pulley 42, and pulley 40 is in alignment with pulley 44 as is clear in FIG. 5.

A pulley 46 is rigid to shaft 34 and disposed thereon between sleeve 30 and pulley 38. Similarly, a pulley 48 is rigid to shaft 36 and disposed thereon between sleeve 32 and pulley 44. Pulleys 46 and 48 are of substantially the same diameter and are of diameters greater than either of the pairs of pulleys 38 and 40 and 42 and 44.

The drive shaft 50 of motor 20 is vertically disposed in advance of plate 28 as is clear in FIGS. 2, 3 and 5, and a pulley 52 is rigid to shaft 50 for rotation relative thereto.

An idler pulley 54 is carried on a projection 56 at the forward and upper end of plate 28 for rotation about a vertical axis as is clear in FIG. 3. An endless flexible belt 58 is operably coupled with pulleys 46, 48, 52 and 54 in a manner to rotate shaft 34 in a clockwise sense when viewing FIG. 3 while simultaneously rotating shaft 36 in a counterclockwise sense when viewing FIG. 3. To this end, shaft 50, and thereby pulley 52, rotate in a clockwise sense when viewing FIGS. 2 and 5. One stretch 60 of belt 58 extends from pulley 52 toward, under, about and over pulley 48 and merges with a second stretch 62 extending from pulley 48 to pulley 54. Stretch 62 is twisted through an angle of 90° at zone 64 in order to be operably coupled with pulley 54. Stretch 62 is thus trained about pulley 54 and merges with a stretch 66, the latter in turn extending between pulley 54 and pulley 46 and being rotated through an angle of 90° at zone 68 in order to be operably coupled with pulley 46. Stretch 66 then passes over, about and beneath pulley 46 and merges with a stretch 70, the latter in turn merging with stretch 60. By virtue of this arrangement, pulleys 38 and 40 rotate with shaft 34 in a clockwise sense when viewing FIG. 3, and pulleys 42 and 44 rotate in a counterclockwise sense with shaft 36 also when viewing FIG. 3.

The speed of rotation of shaft 50 is, of course, controlled by suitable throttle means associated with motor 20. Support 14 is provided with a pair of openings 72 and 74 therethrough which overlie axle 27 as is clear in FIGS. 2 and 3. A pair of normally upright arms 76 and 78 are secured to axle 27 for swinging movement relative thereto and project through openings 72 and 74, respectively, as shown in FIGS. 3 and 4. To this end, a bushing 80 for each of the arms 76 and 78 surrounds axle 27 and the corresponding arm is provided with a sleeve-like element 82 complementally receiving the corresponding bushing 80. Bushing 80 is bonded to axle 27 and element 82 or otherwise secured thereto so that the corresponding arm may swing in opposed directions through a limited arc about axle 27, while at the same time the arm will be biased toward a neutral or substantially vertical position by virtue of the restoring force inherent in bushing 80 when the latter is deformed. It is clear, therefore, that arms 76 and 78 are capable of swinging independently of each other about axle 27.

Arms 76 and 78 are provided intermediate their ends with bearing structures 84 for journalling a pair of jackshafts 86 and 88 respectively, for rotation about axes substantially parallel with the axes of rotation of shafts 34 and 36. Arm 76 is swingable in a vertical plane between wheel 17 and the vertical plane formed by pulleys 38 and 42. In the same manner, arm 78 is swingable in a vertical plane between wheel 16 and the plane formed by pulleys 40 and 44.

Shafts 86 and 88 carry sprockets 90 and 92 respectively, at their ends adjacent wheels 17 and 16, respectively, and endless link chains 94 and 96 couple sprockets 90 and 92 with sprockets 98 and 100, respectively, rigid to and rotatable with wheels 17 and 16, respectively. Rotation of shaft 86 in either direction relative to arm 76 will, therefore, impart rotation to wheel 17 in the corresponding direction. Likewise, rotation of shaft 88 in opposed directions will in turn cause rotation of wheel 16 in the corresponding directions.

A pair of clutch members 102 and 104 are rigid to the inner ends of shafts 86 and 88 respectively. Each of the clutch members 102 and 104 includes a disc 106 spaced from, but in close proximity to the corresponding pulleys on shafts 34 and 36. Each disc 106 has an annular flange 108 thereon projecting outwardly from one face at the periphery thereof. Flange 108 of member 102 substantially surrounds pulleys 38 and 42, as is clear in FIG. 5, and flange 108 of member 104 substantially surrounds pulleys 40 and 44.

An annular element 110 of suitable frictional material such as the material utilized in forming flexible drive belts, is bonded or otherwise secured to the inner surface of flange 108 of each of the members 102 and 104. Element 110 is provided with side surfaces which are substantially complemental to the cone-shaped surfaces of the respective pulleys 38, 40, 42 and 44. The diameter of each of the elements 110 is such that the same is out of frictional interengagement with the adjacent pairs of pulleys on shafts 34 and 36, but when the corresponding clutch member is moved fore or aft, the corresponding element 110 is moved into one or the other of the pulleys.

Control stick 26 is utilized for effecting the selective swinging movements of clutch members 102 and 104 and, to this end, control stick 26 is coupled to a substantially rigid, triangular plate or element 112 which is normally horizontally disposed and coupled at opposed ends thereof as shown in FIGS. 2 and 3 to the upper ends of arms 76 and 78.

Control stick 27 is provided with a forwardly extending portion 114 welded or otherwise rigidly secured to the underside of plate 112 centrally of the latter, and an inclined portion 116 integral with portion 114 and terminating in a handle 118 which is adapted to be grasped by the operator of vehicle 12. A vertically disposed portion 120 is rigid to the end of portion 114 adjacent plate 112 and extends downwardly and is received within a resilient bushing 122 bonded or otherwise secured to a bushing mounting member 124 rigid to plate 28.

The ends of plate 112 are resiliently coupled with the respective upper ends of arms 76 and 78, and to this end a grommet-like member 126 of resilient material is carried by each of the arms 76 and 78 and extends through an opening 128 in the latter. Each member 126 includes a central section 130 of a diameter complemental to the diameter of opening 128 and a pair of opposed end sections 132 and 134 which abut the opposed faces of the corresponding arm. Sections 132 and 134 may be integral with section 130 or only one of such sections 132 and 134 may be integral with section 130 while the other section is independent thereof to facilitate the assembling of member 126 in an operative position.

A bolt 136 passes through a flange 138 integral with plate 112 and then passes through member 126 in a central bore therethrough. A nut 140 bears against a washer 142 and is threadably mounted on bolt 136 to intercouple the corresponding arm with plate 112.

Members 126 at the upper ends of arms 76 and 78 are of a construction to permit limited side movements of control stick 26 by virtue of the fact that as the control stick 26 is moved from one side or the other, the corresponding members 126 are deformed to in turn move the corresponding arms 76 and 78 about axle 27 without causing a twist in either of the arms longitudinally of the latter. It is, therefore, evident that as control stick 26 is moved from side-to-side, arms 76 and 78 are swung about axle 72 in the corresponding direction and there is no lateral movement of either of such arms 76 and 78 relative to plate 28.

Arms 76 and 78 are provided with projections 144 and 146 which extend outwardly therefrom in opposed directions as shown in FIG. 4. Projections 144 and 146 are receivable within slots 148 in respective legs of L-shaped brackets 150 and 152 extending downwardly from the seat 24 disposed above housing 22. Channel elements 154 and 156 are rigid to the inner surface of housing 22 as is shown in FIG. 4 and support a pair of coil springs 158 and 160 respectively for biasing seat 24 upwardly in a position such that projections 144 and 146 are received within the slots 148 of brackets 150 and 152. With projections 144 and 146 in slots 148, arms 76 and 78 are prevented from swinging about axle 27 and the arms are thus locked in a neutral or nondriving condition. In this condition, members 102 and 104 are out of coupled relationship with pulleys 38, 40, 42 and 44. When an operator sits on seat 24 the latter is moved downwardly and brackets 150 and 152 are also shifted downwardly to a position with projections 144 and 146 in clearing relationship to slots 148. Arms 76 and 78 are thus free to swing about axle 27.

In operation, the operator of vehicle 12 is seated on seat 24 with his feet placed on support 14 on opposed sides of motor 20. When motor 20 is started, vehicle 12 remains at rest so long as control stick 26 is in a neutral or nondriving condition. Such neutral position of control stick 26 is assured by virtue of bushings 80 and 122 which bias arms 76 and 78 and control stick 26 in the neutral or nondriving conditions.

When it is desired to advance vehicle 12 forwardly, the operator grasps handle 118 and moves control stick 26 directly forwardly to in turn advance clutch members 102 and 104 forwardly. Such forward movement of clutch members 102 and 104 shifts elements 110 into frictional engagement with pulleys 42 and 44 which are rotating under the influence of shafts 36 in a counterclockwise sense when viewing FIG. 3. This action therefore, rotates members 102 and 104 in the same direction to in turn rotate wheels 16 and 17 about axle 27 to move vehicle 12 forwardly. The speed of vehicle 12 is, of course, controlled by suitable throttle means coupled with motor 20.

In a similar manner, when it is desired to move vehicle 12 in reverse, the operator shifts control stick 26 toward himself to in turn move elements 110 of members 102 and 104 into frictional engagement with pulleys 38 and 40. Reverse rotation is then imparted to wheels 16 and 17.

In FIG. 8, members 102 and 104 are shown in positions relatively to shafts 34 and 36 for effecting a left-hand turn of vehicle 12. To this end, control stick 26 has been shifted to the left without any substantial forward movement. This action swings arm 78 slightly forwardly to move element 110 of member 104 into coupled relationship with pulley 44. Simultaneously, therefore, arm 76 is swung slightly rearwardly so that element 110 of member 102 is moved into coupled relationship with pulley 38. As a result, wheel 17 is moved in reverse, while wheel 16 is moved forwardly. Vehicle 12 is thus caused to turn to the left so long as members 102 and 104 are coupled to respective pulleys in this manner. Upon release of control stick 26, the latter automatically returns to its neutral position under the influence of the restoring forces of bushings 80 and 122.

When it is desired to execute a slight turning action of vehicle 12 while at the same time continuing the forward movement thereof, control stick 26 is moved either forwardly or rearwardly, depending upon the direction of movement desired, and then to one side or the other depending upon the direction in which it is desired to turn the vehicle. As an example, control stick 26 has been moved forwardly and to the left, as shown in FIG. 9, so that element 110 of member 104 is in frictional engagement with pulley 44 but out of engagement with pulley 40. Element 110 of member 102 is out of frictional engagement with either of pulleys 38 and 42 so that the only driving action which results is accomplished through the medium of pulley 44. The resulting movement is forwardly and to the left side and, therefore, results in a turn which is not as sharp as the turn executed when control stick 26 is in the position illustrated in FIG. 8.

It is to be emphasized that as control stick 26 is moved laterally, members 126 deform to an extent sufficient to cause the corresponding arms 76 and 78 to swing about axle 27 without deflecting arms 76 and 78 in opposed directions laterally of plate 28. For instance, in executing the left turn with control stick 26 in the position of FIG. 8, section 132 of member 126 on arm 76 and section 134 of member 126 on arm 78 are both compressed when plate is caused to swing about the axis of portion 120 as control stick 26 is shifted to the side. The compression of these sections permits arms 76 and 78 to swing in opposed directions about axle 27 without binding or encountering other difficulties. There will be a tendency for arms 76 and 78 to move toward plate 28 when the arms are swung about axle 27, but this is compensated for by the fact that sections 130 of members 126 may deform to maintain arms 76 and 78 in their normal vertically disposed planes of swinging movement.

For executing a right turn opposed to the turn executed when control stick 26 is in the position of FIG. 8, members 102 and 104 are moved into positions such that element 110 of member 102 is moved into frictional engagement with pulley 42, while element 110 of member 104 is moved into frictional engagement with pulley 40. This will rotate wheel 17 forwardly and rotate wheel 16 rearwardly.

Turning movements may also be imparted to vehicle 12 when the latter is moving in reverse, and to this end, control stick 26 is initially pulled toward the operator to execute the reversing of vehicle 12 and then from one side or the other, depending upon the direction in which it is desired to turn vehicle 12. For instance, if it is desired to move vehicle 12 in reverse and to turn to the left, control stick 26 is pulled toward the operator and to the left, in which case element 110 of member 102 is moved into frictional engagement with pulley 38 and element 110 of member 104 is out of engagement with pulleys 40 and 44.

Similarly, a right turn may be imparted to vehicle 12 as the same is in reverse by pulling rearwardly on control stick 26 and moving the same simultaneously to the right.

In all cases, control stick 26 returns to its neutral or nondriving condition by virtue of bushing 122 and similarly, arms 76 and 78 are returned to their neutral positions by virtue of bushings 80. Such construction provides a safety measure for vehicle 12 and requires that control stick 26 be deflected in order to drive vehicle 12.

Another safety measure inherent in vehicle 12 is the fact that an operator must be seated on seat 24 or otherwise positioned to deflect the seat 24 downwardly in order to permit swinging movements of arms 76 and 78. Thus, even though motor 20 continues to operate, vehicle 12 will not be capable of movement unless both seat 24 and control stick 26 are shifted out of their initial positions.

Vehicle 12 may be utilized for a number of different purposes, one of which includes the mowing of lawns or the like. To this end, a rotary, grass cutting blade may be secured to drive shaft 50 beneath support 14 for movement over the ground and into cutting relationship with the grass over which vehicle 12 passes.

Having thus described the invention, what is claimed as new and desired to be secured by Letters Patent is:
1. In a power drive:
a support;
a pair of drive wheels;
means mounting said wheels in spaced relationship on said support for rotation relative thereto and independently of each other;
a pair of shafts;
means mounting said shafts in spaced relationship on said support for rotation relative thereto about parallel axes;
means coupled with said shafts for rotating the same in opposed directions respectively;
a pair of clutch members;
means mounting said members on said support for rotation independently of each other about respective axes parallel to the axes of rotation of said shafts and for movement independently of each other between the ends of respective paths of travel transverse to said axes of rotation, each of said members being movable alternately into coupled relationship with said shafts respectively and rotated thereby in said directions as the member approaches the ends of its path of travel;

means coupling each of said members with a corresponding wheel to effect the rotation of the latter in said opposed directions as the member is alternately coupled with and rotated by said shafts;

a control element pivotally carried by said support for movement about a first axis and about a second axis normal to said first axis, said control element being pivotally coupled with each said members respectively for selectively moving each of the latter along its corresponding path of travel; and means coupled with each of said members for biasing the same toward a location intermediate its path of travel, said bias means including a deformable grommet formed of resilient material, said grommet comprising a body having a first surface secured to said support and a second surface secured to said control element.

2. A vehicle comprising:

a support;

a pair of ground-engaging drive wheels carried by said support for rotation relative thereto and independently of each other;

a ground-engaging, stabilizing wheel swively carried by said support in spaced relationship to said pair of drive wheels;

a pair of shafts mounted on said support for rotation relative to the latter about parallel axes;

a prime mover on said support;

means operably coupling said prime mover to said shafts for rotating one of the shafts in one direction and the other shaft in the opposite direction;

a pair of clutch members;

means mounting said members on said support adjacent said shafts for rotation about axes parallel to the axes of rotation of said shaft and for movement along respective paths of travel transversely of said axes of rotation of the shafts, each of said members being alternately movable into coupled relationship with said shafts respectively as the member approaches respective ends of its path of travel to thereby effect rotation of the member in the corresponding direction;

means coupling each member with a corresponding wheel to rotate the latter as the member is rotated;

control means coupled with said members for selectively moving each of the latter along their paths of travel, whereby said wheels are movable over the ground in all directions corresponding to the positions of said members relative to said shafts;

a seat mounted on said support for up and down movement; and means coupled with said seat and said members for releasably locking the latter in positions intermediate their paths of travel when said seat is at the uppermost extremity of its path of movement, said locking means being disposed to permit said members to move along their paths of travel when said seat is adjacent the lowermost extremity of its path of movement.

References Cited by the Examiner

UNITED STATES PATENTS

| | | | |
|---|---|---|---|
| 771,861 | 10/1904 | Curtis | 74—207 |
| 1,680,553 | 8/1928 | Krotz | 180—6.66 |
| 2,329,372 | 9/1943 | Hitch | 180—77 |
| 2,604,747 | 9/1952 | Bash. | |
| 2,931,454 | 5/1960 | Schuster | 180—82 |

BENJAMIN HERSH, *Primary Examiner.*

A. HARRY LEVY, *Examiner.*

J. A. PEKAR, *Assistant Examiner.*